(12) United States Patent
Goldstein (10) Patent No.: US 9,800,402 B2
(45) Date of Patent: *Oct. 24, 2017

(54) SECURE AND DELEGATED DISTRIBUTION OF PRIVATE KEYS VIA DOMAIN NAME SERVICE

(71) Applicant: ValiMail Inc., San Francisco, CA (US)

(72) Inventor: Peter Martin Goldstein, San Francisco, CA (US)

(73) Assignee: VALIMAIL INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,505

(22) Filed: May 12, 2017

(65) Prior Publication Data

US 2017/0250797 A1 Aug. 31, 2017

Related U.S. Application Data

(63) Continuation of application No. 15/255,118, filed on Sep. 1, 2016, now Pat. No. 9,686,073, and a
(Continued)

(51) Int. Cl.
*H04L 9/36* (2006.01)
*H04L 9/06* (2006.01)
(Continued)

(52) U.S. Cl.
CPC ............ *H04L 9/06* (2013.01); *H04L 9/083* (2013.01); *H04L 9/0825* (2013.01); *H04L 9/0838* (2013.01); *H04L 9/3247* (2013.01); *H04L 63/123* (2013.01)

(58) Field of Classification Search
CPC ... H04L 9/0825; H04L 9/3247; H04L 9/0822; H04L 9/083; H04L 9/3249; H04L 2209/24

See application file for complete search history.

(56) References Cited

U.S. PATENT DOCUMENTS

2002/0059286 A1* 5/2002 Challener ............ G06F 21/602
2004/0005061 A1* 1/2004 Buer .................... G06F 21/602
380/282

(Continued)

OTHER PUBLICATIONS

Office Action for U.S. Appl. No. 15/255,118, dated Dec. 28, 2016, 17 Pages.

*Primary Examiner* — Mohammed Waliullah
(74) *Attorney, Agent, or Firm* — Fenwick & West LLP (57) ABSTRACT

A third party system generates a public-private key pair, the public key of the key pair being an encryption key, and the private key of the key pair being a decryption key. The third party system publishes the encryption key as a DNS record of a third party system. The third party system receives a request to sign a message on behalf of a domain owner, the message to be sent to a recipient, and accesses an encrypted delegated private key published by the domain owner via a DNS record of the domain owner, the encrypted delegated private key encrypted using the encryption key. The third party system decrypts the encrypted delegated private key using the decryption key, and generates a signature for the message using the delegated private key. The third party system sends the signature and the message to the recipient.

20 Claims, 4 Drawing Sheets

Related U.S. Application Data continuation of application No. PCT/US2016/015797, filed on Jan. 29, 2016.

(60) Provisional application No. 62/116,414, filed on Feb. 14, 2015.

(51) Int. Cl.
*H04L 9/08* (2006.01)
*H04L 9/32* (2006.01)
*H04L 29/06* (2006.01)

(56) References Cited

U.S. PATENT DOCUMENTS

| | | | |
|---|---|---|---|
| 2005/0039019 A1* | 2/2005 | Delany | H04L 12/58 713/176 |
| 2006/0230461 A1 | 10/2006 | Hauser | |
| 2008/0059787 A1* | 3/2008 | Hohenberger | H04L 9/3013 713/153 |
| 2009/0198997 A1 | 8/2009 | Yeap et al. | |
| 2010/0299399 A1* | 11/2010 | Wanser | G06Q 10/107 709/206 |
| 2011/0296171 A1 | 12/2011 | Fu et al. | |
| 2012/0060033 A1* | 3/2012 | Giuliani | H04L 9/085 713/168 |
| 2012/0179801 A1* | 7/2012 | Luna | H04L 61/6009 709/223 |
| 2012/0216040 A1 | 8/2012 | Tanamy et al. | |
| 2014/0189348 A1* | 7/2014 | El-Shimi | G06F 21/6218 713/165 |
| 2014/0289509 A1 | 9/2014 | Baghdasaryan | |

* cited by examiner

SECURE AND DELEGATED DISTRIBUTION OF PRIVATE KEYS VIA DOMAIN NAME SERVICE

CROSS REFERENCE TO RELATED APPLICATION

This application is a continuation of U.S. application Ser. No. 15/255,118, filed Sep. 1, 2016, which is a continuation of PCT Application No. PCT/US2016/015797, filed Jan. 29, 2016, which claims benefit to U.S. Provisional Application No. 62/116,414, filed Feb. 14, 2015, all of which are hereby incorporated by reference in their entirety.

BACKGROUND

Field of Art

The disclosure generally relates to the field of networking, and specifically to secure and delegated distribution of private keys via the Domain Name Service (DNS).

Description of Art

In distributed messaging systems like electronic mail (email), there is a need to validate the originator of a message against the message's purported identity in order to eliminate fraudulent messages. One approach to this problem is to use public key cryptography to verify the messages. In this approach an encrypted hash is used to validate messages as being associated with an identity. One or more public keys are published in a globally visible directory, wherein only the holder of the identity is allowed to publish records in the directory. Authorized senders are in possession of a corresponding private key, which they can use to encrypt a hashed version of the message and include the encrypted hash as metadata for the message. Recipients can decrypt the metadata using the public key and compare it to their own, independently generated hash of the message. If the hashes match, then the sender is valid. DomainKeys Identified Mail (DKIM) is the standard implementation of this system for email.

This approach can be quite effective, but it has some issues when there are multiple signing entities. Private key distribution becomes challenging when there are multiple distinct entities that are allowed to sign messages authorized against a single shared domain (and hence must have a valid private key) from a single shared domain. For example, if an administrator of "acme.com" wishes to allow signing of messages from "ajax.com", each domain would need a valid private key.

One approach is to allocate different subdomains of the primary domain to the different signing organizations, to eliminate the sharing. In this circumstance each signing organization has complete control of the global directory for its subdomain. While this can work, it fails the primary goal of supporting multiple senders on a single domain as each organization would require a distinct subdomain of the primary domain.

Alternately, each signing entity can generate its own private/public key pair, and provide the public key to the authorizing domain owner to publish in the global directory. By publishing the corresponding public key in the appropriate location in the global directory, the domain owner signals that it is delegating signing authority to the signing entity. However, this manual process tends to be both error-prone and burdensome on the authorizing domain owner. It also makes it difficult to incorporate best practices such as key rotation, as this would require repetition of the manual process each time the key was replaced, causing a situation in practice where a key may not be updated.

Hence, what is lacking is an ability to generate and distribute delegated private keys authorized against a shared domain in a secure and automated fashion to multiple distinct entities, as well as the reliable management and update of such keys.

SUMMARY

In some embodiments, systems and methods for securely distributing delegated private keys for public-key cryptography via the Domain Name Service (DNS) may comprise using public key cryptography to allow secure and automated distribution of private keys via the Domain Name Service (DNS). Such delegated private keys are distributed from domain owners to third-party entities via encrypted data published in DNS. The domain owner publishes the public key in a DNS record within their domain's DNS zone. The third-party entity may then use the corresponding private key for message signing, to negotiate symmetric key exchange, or other purposes as appropriate for the application, on behalf of the domain owner. An automated system handles creating and updating these private/public key pairs, and publishing them to appropriate DNS records on a domain managed by the domain owner.

In some embodiments, third party entities that wish to use private keys authorized by a domain owner (e.g., to sign messages on the domain owner's behalf) generate a dedicated key pair using a public key cryptography algorithm. This key pair will consist of a decryption key and an encryption key. The third party entity publishes the encryption key as a DNS TXT record in a well-defined location (e.g., on a protocol-defined subdomain of a known domain owned by the third party entity), and keeps the decryption key private.

In some embodiments, systems and methods for securely distributing delegated private keys via the Domain Name Service (DNS) may include an automated system that acts on behalf of the owner of an authorizing domain. This automated system is referred to herein as the key pair generator. The key pair generator may be configured to allow a particular third party entity to use a private key associated with a particular authorizing domain. In this circumstance the key pair generator may check for the existence of an encryption key record for the third party entity as described above. In some embodiments, when such an encryption key record is detected and the owner of the authorizing domain wishes to delegate authority to the third party entity, the key pair generator may generate a new public key cryptography key pair that includes a delegated private key (private key) and a verifying key (public key). The key pair generator may encrypt the delegated private key using the encryption key retrieved from the encryption key record, and publish both the verifying key and the encrypted delegated private key in DNS at well-defined locations known respectively as the verifying key record and encrypted delegated private key record. Distinct records may be generated for each third party entity for which the owner of the authorizing domain wishes to generate a key.

In some embodiments, systems and methods for securely distributing delegated private keys via the Domain Name Service (DNS) may include a step whereby a third party entity that wishes to use such a delegated private key (e.g., to sign a message on the authorized domain's behalf), checks for the existence of corresponding verifying key and encrypted delegated private key records. Should these records exist, the third-party entity may then use its private decryption key to decrypt the delegated private key from the encrypted delegated private key record. This delegated private key can then be used by the third party entity on behalf of the authorizing domain.

In further embodiments, parties that wish to use the public key corresponding to a delegated private key (e.g., to verify a message signature, or to securely exchange a symmetric key with the private key holder), may retrieve the verifying key from the verifying key record published by the key pair generator. The exact format of the verifying key record will vary from application to application, and this format should be considered non-limiting.

In the specific example of using this system to generate message signatures, a standard signature verification algorithm may then be performed by a message receiver, and the signature may be either verified or rejected. In either case the verifying party can use a standard procedure, and does not need to know that a third party entity performed the signature.

In further embodiments, systems and methods for securely distributing delegated private keys via the Domain Name Service (DNS) may advance the art of key distribution over the Internet, by leveraging DNS—an existing, globally-available, and authenticated directory system—to support the secure distribution of delegated private keys for public key cryptography. In addition, the methods may support automatic update of said keys, either because of the passage of time or because one or more keys were potentially compromised. This is a substantial improvement to the inherent security and robustness of such systems.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a system and process capable of secure and delegated distribution of private keys via DNS. In an embodiment, a third party system generates a public-private key pair, the public key of the key pair being an encryption key, and the private key of the key pair being a decryption key. The third party system publishes the encryption key as a DNS record of a third party system. The third party system receives a request to sign a message on behalf of a domain owner, the message to be sent to a recipient, and accesses an encrypted delegated private key published by the domain owner via a DNS record of the domain owner, the encrypted delegated private key encrypted using the encryption key. The third party system decrypts the encrypted delegated private key using the decryption key, and generates a signature for the message using the delegated private key. The third party system sends the signature and the message to the recipient.

In an embodiment, a domain owner system identifies a third party system to delegate signing of messages. The domain owner system accesses an encryption key published by the third party system at a DNS record of the third party system. The domain owner system generates a public-private key pair, the public key of the key pair being a verifying key, and the private key of the key pair being a delegated private key, the delegated private key to be used by the third party system to sign messages on behalf of a domain owner of the domain owner system. The domain owner system encrypts the delegated private key using the encryption key to generate an encrypted delegated private key. The domain owner system publishes the encrypted delegated private key at a DNS record of the domain owner, and publishes the verifying key at the DNS record of the domain owner.

Introduction

Public key cryptography plays an important role in a number of different applications. But for many of these applications there is a significant challenge in automating the underlying processes of distributing private keys to signers, and associating public keys with identities. DNS offers a tool that can be used to support an automated process that addresses both of these challenges.

Consider the specific example application of cryptographic signatures—metadata that can be included with a message to verify both the identity of a message originator, as well as the integrity of the message when received. This cryptographic signing can be performed with one of any number of public key cryptography algorithms (e.g., RSA, DSA). Such cryptographic signatures have wide application, including specific usage in the domain of email message authentication through the use of the DomainKeys Identified Mail (DKIM) protocol.

When creating a cryptographic signature, the originator of a message derives a set of bytes representing the message they want to sign. This is usually done with a hash algorithm such as SHA-512 or MD-5, to ensure that it is extremely difficult to generate another message that yields the same set of representative bytes. In this case the representative set of bytes is known as a message hash.

The originator then encrypts this message hash with the private part of a public key pair, hereafter referred to as a delegated private key. The delegated private key is used to generate the message signature, and by the nature of the underlying cryptographic procedure, it should be impossible for anyone without possession of the delegated private key to generate a correct signature. Possession of the delegated private key is restricted to those who are authorized to sign messages.

The corresponding public part of the public key pair, known as the verifying key, can be used to verify the message signature, and hence the authority and integrity of the message. A recipient of the message can use the same procedure employed by the originator to generate a message hash. The recipient can then use the verifying key to decrypt the message signature and confirm that the decrypted value matches the message hash computed by the recipient. If the value matches, the message signature is confirmed. Otherwise it is rejected.

The message signature will only be confirmed if the signer of the message possesses a delegated private key that is a key pair to the verifying key. So if the recipient can obtain the verifying key in such a way that the source of the verifying key can be authenticated, then this allows the message recipient to authorize that message as ultimately deriving from that source.

The Domain Name Service (DNS) can be used to associate a domain (and hence the identity of the domain's registered owner) with a verifying key in a secure way. In this scenario a DNS TXT record containing the verifying key is published under a well-defined subdomain in a zone registered to the organization. As only the registered owner of an organizational domain, or those parties authorized by the registered owner, can publish DNS records in that zone then the publication of the DNS record containing the verifying key must be authorized by the registered owner.

Cryptographic signing algorithms inherently require that the originator of the message possess the delegated private key. Use of DNS to authenticate the verifying very requires that the verifying key be available to the registered domain owner or a party they authorize to update their DNS records. As the delegated private key and verifying key can only be generated together as a pair, this presents a challenge when a registered domain owner wants to allow a third party entity to sign messages on their behalf, but does not want to give that entity the ability to publish DNS records in their zone. There must be a distribution of either the delegated private key or the verifying key from one party to another, which presents a number of challenges. Moreover, future updates to the delegated private/verifying key pair present similar problems.

Example Key Delegation System

Figure 1:
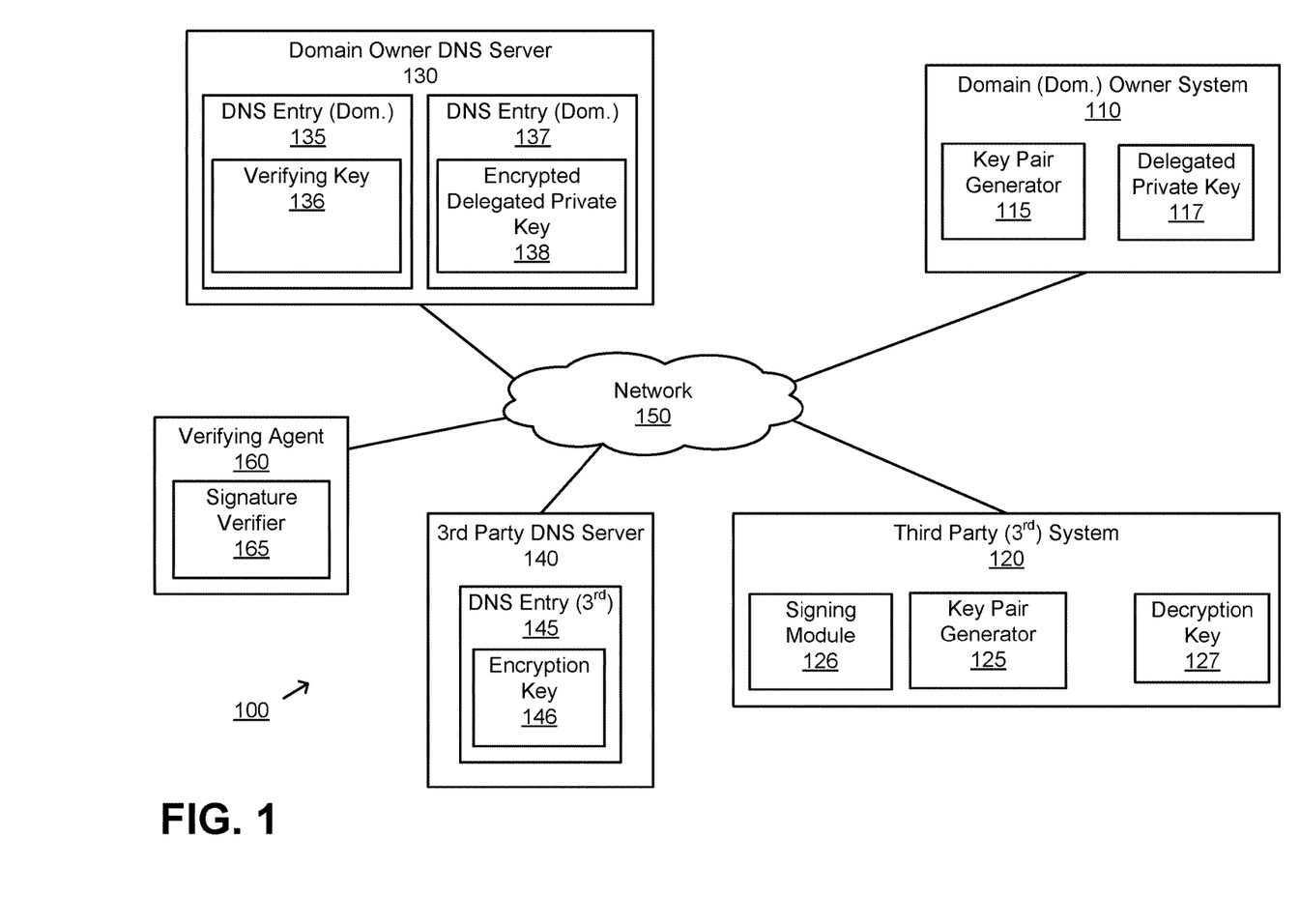
FIG. 1 illustrates an example system capable of secure and delegated distribution of private keys via DNS according to an embodiment.

FIG. 1 illustrates an example system 100 capable of secure and delegated distribution of private keys via DNS according to an embodiment. The system 100 includes a network 150, one or more verifying agents 160, domain owner DNS server 130 and third party DNS server 140, a domain owner system 110, and a third party system 120. Although the illustrated system 100 includes the elements shown in FIG. 1, in other embodiments the system 100 may include different elements. Furthermore, the functionalities of each element may be distributed differently among the elements in other embodiments.

The network 150, which can be wired, wireless, or a combination thereof, enables communications among the verifying agents 160, the DNS systems 130/140, domain owner system 110, and third party system 120, and may include the Internet, a LAN, VLAN (e.g., with VPN), WAN, or other network. In one embodiment, the network 150 uses standard communications technologies and/or protocols, such as Hypertext transfer Protocol (HTTP), Transmission Control Protocol/Internet Protocol (TCP/IP), Uniform Resource Locators (URLs), and the Domain Name System (DNS). In another embodiment, the entities can use custom and/or dedicated data communications technologies instead of, or in addition to, the ones described above.

The domain owner DNS server 130 and third party DNS server 140 store DNS entries, such as DNS entries 135, 137, and 145, for use in a DNS system. Each DNS server may comprise one or more computing systems such as the computing system described with reference to FIG. 4.

Each DNS entry may include one or more DNS records for a particular domain, such an A record, MX record, and so on, as known in the art. Some of the DNS entries, such as DNS entries 135, 137, and 145 may include cryptographic keys, such as the verifying key 136, the encrypted delegated private key 138, and the encryption key 146. In one embodiment, these keys are stored as TXT records in each DNS entry. These keys may be used to sign for, and verify, the sender authenticity and contents of data sent through the network 150. Such data may include a message, file, email, and so on. Although the records as illustrated in FIG. 1 are separated into multiple entries and on multiple servers, in other embodiments the records are combined into fewer entries, fewer servers, a single entry, or some other combination.

The domain owner system 110 comprises one or more computing systems, e.g., servers that are used by a domain owner to host a domain and perform activities related to that domain. These activities may include serving web pages, sending and receiving emails, hosting files, performing e-commerce, and so on. In one embodiment, these computing systems are configured similarly to the computing system described with reference to FIG. 4.

As illustrated, the domain owner system 110 includes a key pair generator 115, and a delegated private key 117. Although the illustrated domain owner system 110 includes the elements shown in FIG. 1, in other embodiments the domain owner system 110 may include different elements. For example, the domain owner system 110 may include additional keys to be used in public key cryptography schemes. Furthermore, the functionalities of each element may be distributed differently among the elements in other embodiments.

The key pair generator 115 of the domain owner system 110 generates private and public key pairs. In one embodiment, the key pair generator 115 generates a key pair comprised of a delegated private key 117 and a verifying key 136. The verifying key 136 is the public key in this key pair, while the delegated private key 117 is the private key. The key pair generator 115 places the verifying key 136 as a record in a DNS entry 135 on the domain owner DNS server 130.

The key pair generator 115 further generates an encrypted delegated private key 138 by encrypting the delegated private key 117 with the encryption key 146 stored at the 3rd party DNS server 140, and stores this encrypted delegated private key 138 as a record at domain owner DNS server 130. The encryption key 146 is generated by the third party system 120 as part of a key pair. Thus, only the third party system 120 can decrypt the encrypted delegated private key 138 in order to retrieve the delegated private key 138, which may be used by the third party system 120 to sign and/or encrypt data on behalf of the domain owner.

The third party system 120 signs or encrypts data on behalf of a domain owner using a delegated private key securely passed to the third party system 120 by the domain owner. The third party system 120 comprises one or more computing systems, which may be configured similarly to the computing system described with reference to FIG. 4.

As illustrated, the third party system 120 includes a signing module 126, a key pair generator 125, and a decryption key 127. Although the illustrated third party system 120 includes the elements shown in FIG. 1, in other embodiments the third party system 120 may include different elements. For example, the third party system 120 may include additional keys to be used in public key cryptography schemes. Furthermore, the functionalities of each element may be distributed differently among the elements in other embodiments.

The signing module 126 of the third party system 120 signs messages or other data on behalf of the domain owner using a private key. The signing method may be based on well-known methods of public key cryptography. As an example, the third party system 120 may be a security system, data/message distribution service, or other third party provider that provides a centralized messaging system for multiple domain owners. The third party system 120 may send data and/or other messages on behalf of the domain owner system 110 to one or more recipients, and signs this data so that the recipients may verify that the data is authentic and has not been altered. To do this, the signing module 126 retrieves the encrypted delegated private key 138 provided by the domain owner system 110. The encrypted delegated private key 138 is the delegated private key 117 that has been encrypted using the encryption key 146. The signing module 126 is able to decrypt the encrypted delegated private key 138 using the decryption key 127 stored at the third party system 120, in order to access the delegated private key 117. The signing module 126 uses the decrypted delegated private key 117 to generate a signature for the data that is to be sent to the recipient. The third party system sends the signature and to original data to the recipient.

The key pair generator 125 of the third party system 120 generates public/private key pairs to facilitate the signing of data on behalf of domain owners. In one embodiment, for each domain owner for which the third party system 120 is to sign data, the key pair generator 125 generates a decryption key 127 (the private key) and an encryption key 146 (the public key). The third party system 120 publishes the encryption key 146 in a record at DNS entry 145 on third party DNS server 140, so that the domain owner system 110 may retrieve it to encrypt a delegated private key 117, thus generating the encrypted delegated private key 138.

Figure 4:
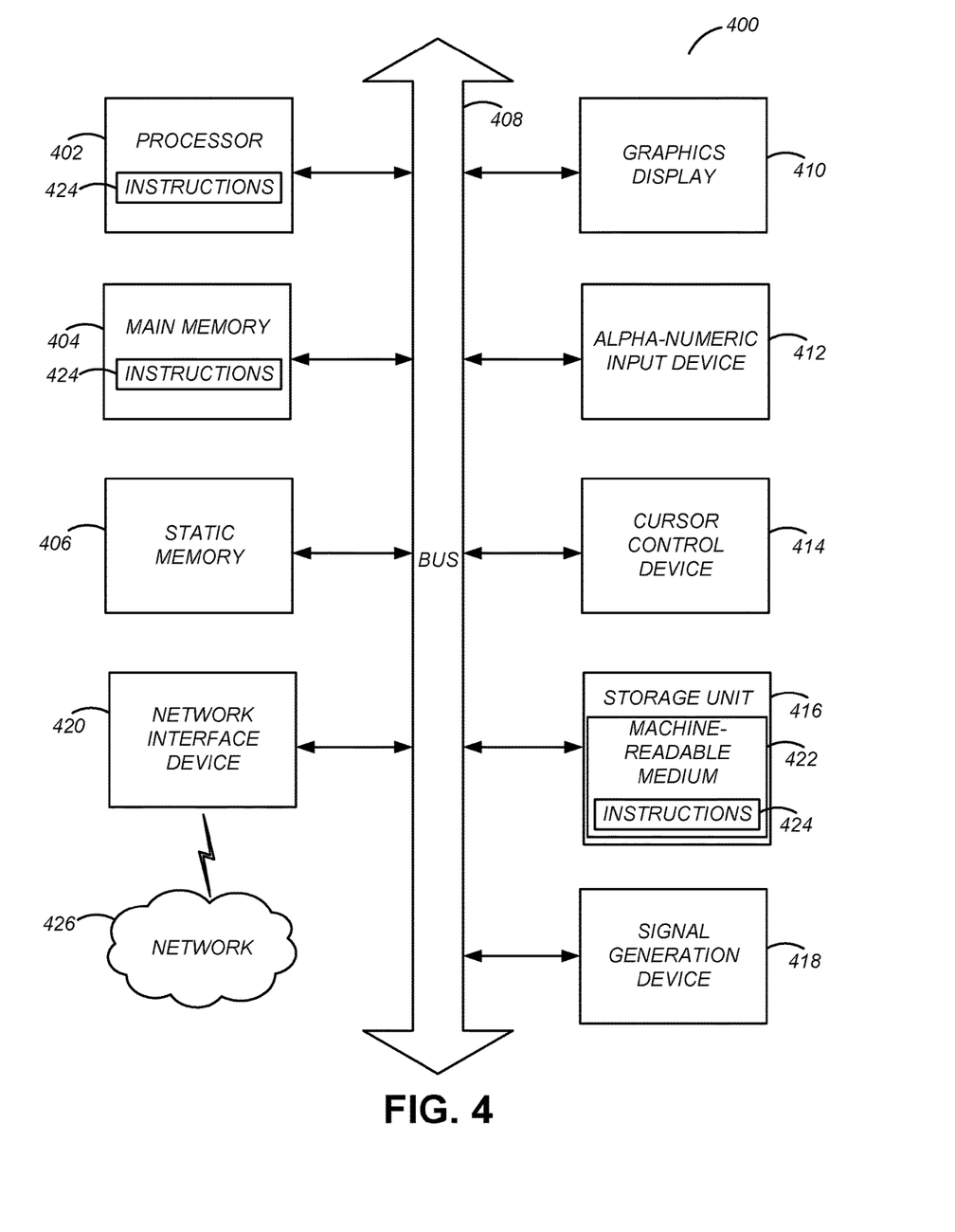
FIG. 4 is a block diagram illustrating components of an example machine able to read instructions from a machine-readable medium and execute them in a processor (or controller).

The verifying agents 160 verify signatures signed by the third party system 120 and may be configured similar to a computing system described with FIG. 4. For example, the verifying agent 160 may be a server receiving data signed by the third party system 120.

The verifying agent 160 includes a signature verifier 165 to verify the signature of data that it has received. This data may have been signed by the third party system 120 on behalf of a domain owner system 110, or signed by the domain owner system 110 itself. To verify the signature, the signature verifier 165 uses the verifying key 136 published in a DNS entry 135 by the domain owner system 110 and determines whether the signature indicates that the received data is valid and authentic. For example, the data received may have been hashed, with the hash encrypted using the delegated private key 117 by the third party system 120. The signature verifier 165 decrypts the hash using the verifying key 136, and determines whether the hash matches a locally computed hash of the data. If the two hashes match, then the signature verifier 165 indicates that the data is legitimate. Otherwise, the signature verifier 165 indicates that the message is not legitimate.

Using the system 100 described above, a third party system 120 is able to sign messages on behalf of a domain owner. This may provide a method by which registered domain owners can securely distribute delegated private keys to third parties to whom they wish to delegate authority associated with their domain identity. In some embodiments, this provides an advantage such that neither the registered domain owner nor the third party needs to manually update DNS records after an initial setup. Additional details regarding the processes described above are described with reference to FIGS. 2-3.

Example Interaction Diagram for Key Pair Generation

Figure 2:
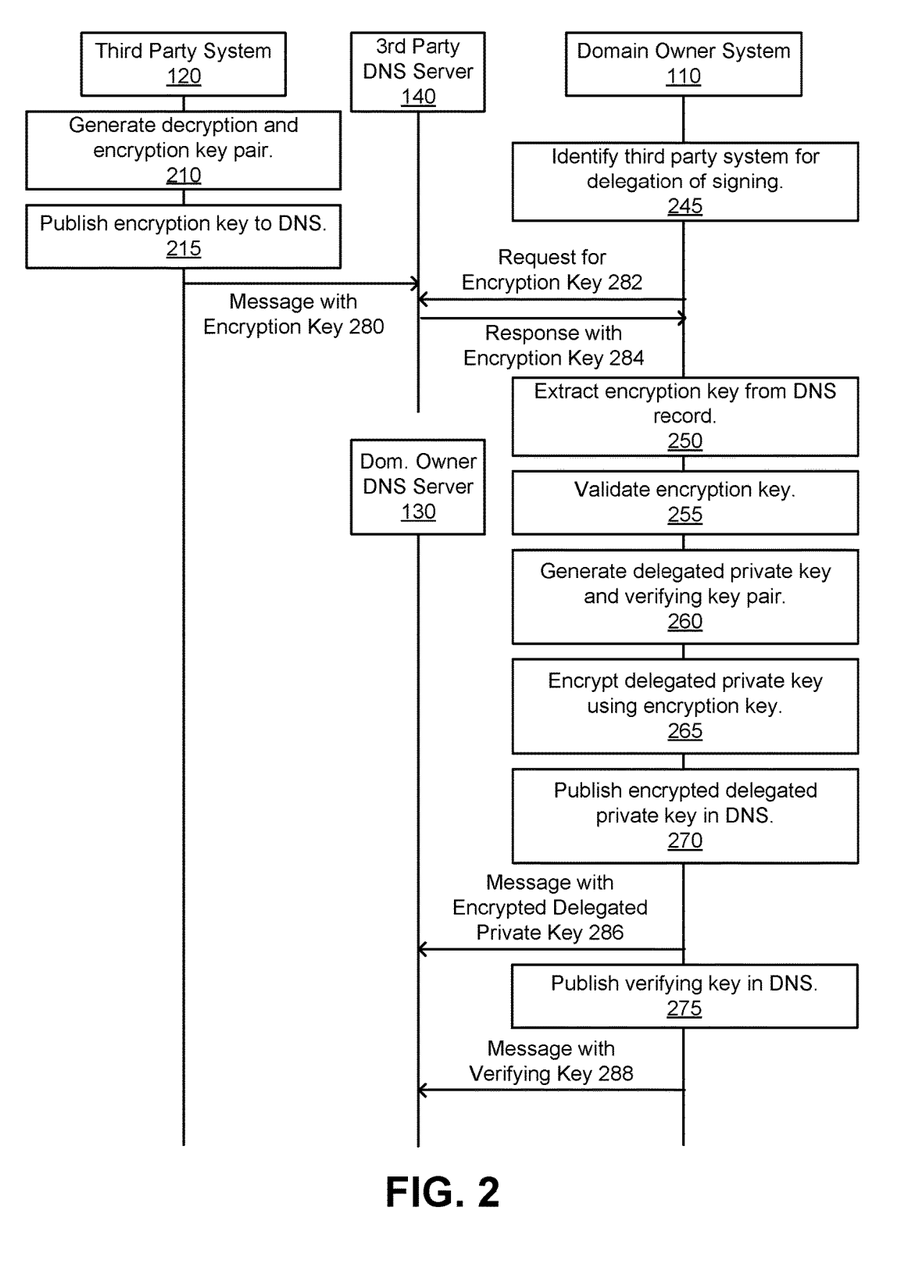
FIG. 2 is an interaction diagram and flow chart illustrating an exemplary process for enabling a third party system to generate keys on behalf of a domain owner according to one embodiment.

FIG. 2 is an interaction diagram and flow chart illustrating an exemplary process for enabling a third party system 120 to generate keys on behalf of a domain owner according to one embodiment. In one embodiment, FIG. 2 attributes the operations in process to the indicated elements. However, some or all of the steps may be performed by other elements. In addition, some embodiments may perform the operations in parallel, perform the operations in different orders, or perform different operations. Also, it is noted that in one example embodiment the steps and/or modules may be embodied as instructions, e.g., instructions 424, that may be executed by the processor 402 described with respect to FIG. 4.

In one embodiment, the third party system 120 generates 210 a decryption and encryption key pair using one of any number of well-known public key encryption algorithms. A non-limiting example of such a public key encryption algorithm would be 2048-bit Rivest-Shamir-Adleman (RSA).

The decryption key 127, which is the private part of this key pair, may be stored internally for later use. The encryption key 146, which is the public part of this key pair, may be published 215 as a record in DNS entry 145 at third party DNS server 140 such that it is available via DNS to any domains that may wish to delegate signing authority to the third party system 120.

The encryption key 146 may be published under any domain. In one embodiment, the publication of the encryption key record may be such that a) the record is published within a zone registered to the third party system 120 and that b) the record location is shared with the domain owner system 110 from whom the third party system 120 is to obtain a delegated private key.

As a non-limiting example of an encryption key publication, a company Example Corp is the registered owner of the domain "examplecorp.com" and is to act as a third party system 120 for a domain owner. In this case the record including the encryption key 146 for Example Corp could be published at the domain zone "_encr._ddkim.examplecorp.com," as that domain is in a zone registered to Example Corp. The domain owner would be notified of the location of this record, or may automatically locate it based on a standardized naming scheme of the domain zone indicating the location of a record having the encryption key 146.

In one embodiment, a third party system 120 has multiple records with each record including a separate encryption key 146, each intended for use with one or more domain owners (i.e., an authorizing domain). In such a case, a number of different records having encryption keys 146 may be published by the third party system 120. For example, referring back to the previous example, these records may be published at: 1) senderdomain1._encr._ddkim.examplecorp.com, 2) senderdomain2._encr._ddkim.examplecorp.com, 3) senderdomain3._encr._ddkim.examplecorp.com, and so on.

The format of the record that includes the encryption key 146 may vary. In one embodiment the DNS record with the encryption key 146 is in a format that can be read by the domain owner system 110 (and the key pair generator 115). In one embodiment the record with the encryption key 146 also includes a number of other pieces of information including, but limited to: 1) a token that distinguishes this record from other text records that might be published on this domain, 2) the creation time for the record, 3) an expiration time for the record, 4) a selector field that allows publication of multiple encryption keys 146 on the same subdomain, and 5) a field indicating the algorithm to be used for encryption.

An example of such a format is a record with content "v=ENCDDKIM1; k=< . . . >" where the value following 'k=' is the Abstract Syntax Notation One Distinguished Encoding Rules (ASN.1 DER)-encoded encryption key value, assuming that the encryption key was generated using RSA-2048.

In one embodiment, should the third party system 120 need to regenerate the encryption key 146 or decryption key 127, then the third party system 120 repeats the process in a similar manner to the case where the key pair is being generated for the first time. This may be needed due to a failure condition, compromised keys, or any other reason.

On the side of the domain owner, the domain owner system 110 identifies 245 the third party system 120 for delegation of the data signing. In one embodiment, to do this, the domain owner system 110 updates a configuration of the key pair generator 115 with identifying information of the third party system 120. The domain owner system 110 checks for the existence of a DNS entry having the encryption key 146 at the third party DNS server 140. The location of the third party DNS server 140 may be provided to the domain owner system 110 externally, or the domain owner system 110 may be able to discover the location of the third party DNS server 140 using a provided domain name of the third party system 120.

The domain owner system 110 checks for the existence of the encryption key 146 by sending a request 282 to DNS. If a DNS record exists, the domain owner system 110 receives a response 284 with a DNS record that includes the encryption key 146 of the third party system 120. The domain owner system 110 extracts 250 the received encryption key 146 from the record.

In one embodiment, the domain owner system 110 also validates 255 the encryption key 146 through one or more different operations which may include: 1) ensuring that the encryption key in the bytes of the received response 284 can be decoded, 2) that the decoded bytes correspond to a valid key for the expected encryption algorithm, or 3) that the metadata in the DNS record of the response 284 meets some criteria.

For example, the domain owner system 110 may ensure that the received DNS TXT record including the encryption key 146 starts with "v=ENCDDKIM1; k=" and that the value following the 'k=' corresponds to an ASN.1 DER encoded RSA public key (i.e., the encryption key).

If the validation of the encryption key 146 fails, then the domain owner system 110 may log an error and/or send an alert to an alert channel (not shown). Otherwise, the domain owner system 110 generates 260 a key pair comprising a delegated private key 117 and verifying key 136, using a selected public key algorithm (e.g., RSA-2048, SHA-1).

The domain owner system 110 encrypts 265 the delegated private key 117 using the encryption key 146. The domain owner system 110 may encrypt the delegated private key 117 using a variety of encryption methods, such as using the public key algorithm used to generate the encryption and decryption key pair and/or the delegated private key and verifying key pair. For example, the encrypting algorithm may be RSA-2048. As another example, the domain owner system 110 may divide the delegated private key 117 into blocks of 1024 bytes, and encrypts each block using RSA-2048 with the encryption key 146 as the encryption key. The domain owner system 110 concatenates the resulting output blocks and encodes them in Base64 to produce the encrypted delegated private key 138.

After encrypting the delegated private key 117 to generate the encrypted delegated private key 138, the domain owner system 110 publishes 270 the encrypted delegated private key 138 on the domain owner DNS server 130. Specifically, in one embodiment, the domain owner system 110 publishes the encrypted delegated private key 138 as a TXT record.

While in some embodiments this DNS TXT record may be made generally available to any client that submits the appropriate DNS query, in other embodiments the results of this query may change based on characteristics of the client or query (e.g. client IP address, time of day). In these latter embodiments, this can enable an additional level of security against leaks of the decryption key 127, which may be used to decrypt the encrypted delegated private key 138. For example, the domain owner system 110 may have configured the domain owner DNS server 130 to only respond with the DNS TXT record containing the encrypted delegated private key 138 to a set of IP addresses known to be owned by the third party system 120 (e.g., using split-horizon DNS or split-view DNS). This ensures that, even if the decryption key 127 is compromised, the encrypted delegated private key 138 can only be used from within infrastructure controlled by the third party system 120.

The domain owner system 110 may publish 270 the DNS record having the encrypted delegated private key 138 with any domain. In one embodiment the domain owner system 110 publishes the DNS record having the encrypted delegated private key 138 within the zone of the domain for which signing is to be authorized. In one embodiment, the domain owner system 110 publishes the DNS record in a location known by the third party system 120, either by convention or by direct communication.

So long as the encryption process is well defined and known to the third party system 120, possession of the decryption key 127 allows the third party system 120 to decrypt the encrypted delegated private key 138 to obtain the delegated private key 117. Moreover, only the third party system 120 is able to decrypt the encrypted delegated private key 138, because such decryption would require possession of the decryption key 127. Thus, the publication of the encrypted delegated private key 138 at the domain owner DNS server 130 is secure.

As an example of the above process, assume a third party system 120 belongs to ExampleCorp, and assume that the domain that wishes to delegate a private key to ExampleCorp is "somedomain.com". The DNS record including the encrypted delegated private key 138 might be published at a domain of "examplecorp.com._sgn._ddkim.somedomain.com".

The format of the record including the encrypted delegated private key 138 may vary. In one embodiment, the record includes the encrypted delegated private key 138 in a format (e.g., text, binary, big endian, little endian, etc.) that can be read by the third party system 120. In alternative embodiments, the record may also contain a number of other pieces of information including, but not limited to: 1) a token that distinguishes this record from other text records that might be published on this domain, 2) the creation time for the record, 3) an expiration time for the record, and 4) a selector field that allows publication of multiple records having encrypted delegated private keys on the same subdomain.

Referring again to the above example, the format of the record may be: "v=SGNDDKIM1; k=< . . . >" where the bracketed value following 'k=' is the encrypted delegated private key 138 described above.

In one embodiment, the domain owner system 110 also publishes 275 the verifying key 136 as a record to the domain owner DNS server 130. In some embodiments the publication domain and exact format of the verifying key 136 is dictated by the use to which the delegated private key 138 is being put, and the corresponding expectations of the parties using the verifying key 136.

For example, assume that the delegated private key 138 is intended for use as a signing key as part of the DKIM process of email authentication. Then the domain and format of the DNS record having the verifying key 136 is dictated by DKIM. In this case, continuing the earlier example and assuming a selector of 'examplecorp', the record would be published at "examplecorp._domainkey.somedomain.com" and the record body may be "v=DKIM1; p=< . . . >", where the value in < . . . > after the 'p=' is the ASN1. DER encoded form of the verifying key 136.

In one embodiment, if the third party system 120 has previously been authorized to sign for the domain for which the delegated private key 138 is being issued, then the domain owner system 110 may further delete any pre-existing records from the domain owner DNS server 130 including any prior encrypted delegated private keys or verifying keys, to prevent use of the now obsolete keys. This process may be delayed, however, to allow any messages which may already have been signed, but not yet verified by their recipients, to be successfully verified.

In one embodiment, the keys are regenerated in response to events other than the initial configuration the third party system 120. For example, the third party system 120 may update its DNS record of the encryption key 146 with a new encrypting key, may trigger this regeneration. In one embodiment, the domain owner system 110 polls the record including the encryption key 146 on a regular basis to detect such changes. In one embodiment, the domain owner system 110 reacts to the changes by generating new delegated private keys and verifying keys, however, in other embodiments, the domain owner system 110 simply encrypts the existing delegated private key with the new encrypting key and publishes the new encrypted delegated private key to the domain owner DNS server 130.

In one embodiment, the domain owner system 110 revokes an existing key pair and replaces it with a new key pair using the process described above. This may occur because of some security breach, or simply as a best practice in response to the passage of time.

Example Interaction Diagram for Data Signing

Figure 3:
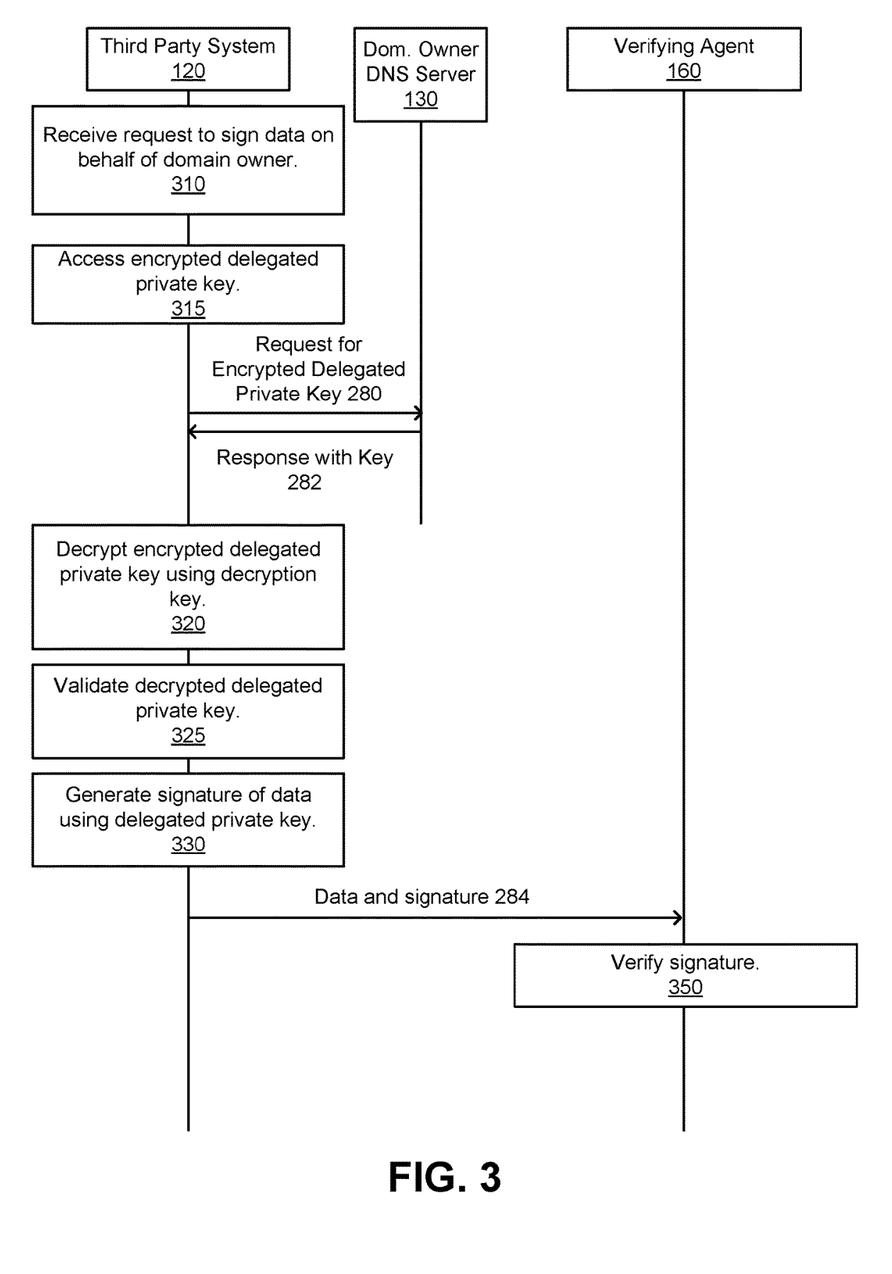
FIG. 3 is an interaction diagram and flow chart illustrating an exemplary process for enabling a third party system 120 to sign messages on behalf of a domain owner according to one embodiment.

FIG. 3 is an interaction diagram and flow chart illustrating an exemplary process for enabling a third party system 120 to sign messages on behalf of a domain owner according to one embodiment. In one embodiment, FIG. 3 attributes the operations in process to the indicated elements. However, some or all of the steps may be performed by other elements. In addition, some embodiments may perform the operations in parallel, perform the operations in different orders, or perform different operations. Also, it is noted that in one example embodiment the steps and/or modules may be embodied as instructions, e.g., instructions 424, that may be executed by the processor 402 described with respect to FIG. 4.

The third party system 120 may receive 310 a request to sign a message on behalf of a domain owner (not shown). The third party system 120 may access 315 the encrypted delegated private key 138 stored in a known record location on a DNS server, such as domain owner DNS server 130. If this record is not found, the third party system 120 may indicate an error. Otherwise, the third party system 120 decrypts 320 the encrypted delegated private key 138 using the locally stored decryption key 127 which was previously generated by the third party system 120.

In one embodiment, the third party system 120 validates 325 the decrypted delegated private key 117. The validation of the delegated private key 117 may include a number of possible steps, such as: 1) ensuring that the bytes can be decoded, 2) that the decoded bytes correspond to a valid key for the expected encryption algorithm, or 3) that the metadata in the DNS record including the encrypted delegated private key 138 meets some criteria (e.g., expiration time, creation time, encryption algorithm used, etc.).

For example, the third party system 120 may validate that the format of the DNS record including the encrypted delegated private key matches "v=SGNDDKIM1; k=< . . . >", and that the value following the 'k=' corresponds to an encrypted delegated private key as described above.

Assuming that the delegated private key 117 is found to be valid, the third party system 120 uses the delegated private key 117 as an input into a signing process for data. This data may be a message such as email, may be used for symmetric key exchange, and so on. In one embodiment, the third party system 120 generates 330 a signature of the data using the delegated private key 117. This signature is then verified 350 by the verifying agent 160. The exact details of the process are immaterial to the methods, provided that the signature process employs public key cryptographic signatures. One non-limiting example of such a process would be to use the delegated private key 117 as a DKIM signature for outbound email.

The example of message signing is a real-world example of how the system and methods for the distribution of delegated private keys might be used, but the specific case of message signing should be considered non-limiting. As described above, message signing is an important use case for this method, but is not the only such process where this method adds value.

Example Machine Architecture

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400. The computer system 400 can be used to execute instructions 424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 400 also includes a main memory 404. The computer system may include a storage unit 416. The processor 402, memory 404 and the storage unit 416 communicate via a bus 408.

In addition, the computer system 406 can include a static memory 406, a display driver 410 (e.g., to drive a plasma display panel (PDP), a liquid crystal display (LCD), or a projector). The computer system 400 may also include alphanumeric input device 412 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-5. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process capable of secure and delegated distribution of private keys via DNS. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable storage medium configured to store program code, the program code comprising instructions that when executed by a processor causes the processor to:
   identify, at a domain owner system, a third party system to delegate signing of messages;
   access an encryption key at a third party domain name system (DNS) record of the third party system published at a DNS server of the third party system, the encryption key having a corresponding decryption key, and the DNS server of the third party system being part of a global directory system capable of establishing the authenticity of the third party system;
   generate a public-private key pair, the public key of the key pair being a verifying key, and the private key of the key pair being a delegated private key, the delegated private key to be used by the third party system to sign on behalf of the domain owner for messages restricted to a first subdomain of the domain owner system;
   encrypt the delegated private key using the encryption key to generate an encrypted delegated private key;
   publish the encrypted delegated private key at a DNS record of a DNS server associated with the first subdomain of the domain owner system; and
   publish the verifying key at the DNS record of the DNS server associated with the first subdomain of the domain owner system.

2. The computer readable storage medium of claim 1, wherein the domain owner system publishes a plurality of encrypted delegated private key and verifying key sets, each encrypted delegated private key and verifying key set published at different subdomains of the domain owner system and each encrypted delegated private key and verifying key set generated based on separate encryption keys published by separate third party systems, each delegated private key allowing a respective third party system to sign on behalf of the domain owner for messages restricted to the respective subdomain at which the corresponding encrypted delegated private key is published.

3. The computer readable storage medium of claim 1, wherein the DNS server associated with the subdomain is configured only to respond to a request for the encrypted delegated private key when the request is from a network addresses of the third party system whose encryption key was used to encrypt the encrypted delegated private key.

4. The non-transitory computer readable storage medium of claim 1, wherein the instructions further comprise instructions that when executed by a processor causes the processor to:
   identify, at the domain owner system, a second third party system to delegate signing of messages;
   access a second encryption key of the second third party system;
   generate a second verifying key and a second delegated private key, the second delegated private key to be used by the second third party system to sign on behalf of the domain owner for messages restricted to a second subdomain of the domain owner system;

encrypt the second delegated private key using the second encryption key to generate a second encrypted delegated private key;

publish the second encrypted delegated private key at a second DNS record of a DNS server associated with the second subdomain of the domain owner system, the second subdomain being different from the first subdomain; and publish the second verifying key at the second DNS record of the DNS server associated with the second subdomain of the domain owner system.

5. The computer readable storage medium of claim 1, wherein instructions to generate the public-private key pair further comprises instructions that when executed causes the processor to generate the public-private key pair using any public private key pair generation algorithm.

6. The computer readable storage medium of claim 1, wherein the instructions further comprise instructions that when executed by a processor causes the processor to:
determine that the encryption key published by the third party system has updated;
re-encrypt the delegated private key with the updated encryption key; and
publish the re-encrypted delegated private key at the DNS record of the domain owner.

7. The computer readable storage medium of claim 1, wherein the instructions further comprise instructions that when executed by a processor causes the processor to:
validate the encryption key by:
determining that the bytes of the accessed DNS record including encryption key can be decoded; and
determining that the decoded encryption key is generated with an expected encryption key generation algorithm.

8. The computer readable storage medium of claim 1, wherein the storage medium stores further instructions for the encryption of the delegated private key using the encryption key, the instructions when executed by a processor causes the processor to:
divide the delegated private key into one or more blocks;
encrypt each block of the one or more blocks using the encryption key; and
concatenate each encrypted block together to generate the encrypted delegated private key.

9. The computer readable storage medium of claim 1, wherein the DNS record of the domain owner further comprises a token that distinguishes the DNS record from other text records that are published on a domain of the domain owner, a creation time for the DNS record, an expiration time for the DNS record, a selector field that allows publication of multiple encryption keys on the same subdomain, and a field indicating an algorithm used for encryption.

10. The computer readable storage medium of claim 1, wherein the storage medium stores further instructions for the publication of the verifying key at the DNS record of the domain owner, the instructions when executed by a processor causes the processor to:
format the DNS record storing the verifying key in a format compatible with DomainKeys Identified Mail (DKIM).

11. A computer-implemented process comprising:
generating a public-private key pair, the public key of the key pair being an encryption key, and the private key of the key pair being a decryption key;

publishing the encryption key as a third party domain name service (DNS) record at a DNS system associated with the third party system;
accessing an encrypted delegated private key in a domain owner DNS record at a DNS server associated with a subdomain of the domain owner system, the encrypted delegated private key encrypted using the encryption key by the domain owner system, and the DNS server of the domain owner system being part of a global directory system capable of establishing the authenticity of the domain owner system;
decrypting the encrypted delegated private key using the decryption key, the decrypted delegated private key capable of allowing the third party system to sign on behalf of the domain owner for messages restricted to a first subdomain of the domain owner system;
generating a signature for a message of the first subdomain of the domain owner system using the delegated private key; and
transmitting the signature and the message to the recipient on behalf of the domain owner system.

12. The process of claim 11, wherein the third party system publishes a plurality of encryption keys in DNS records at different subdomains of third party system, each encryption key generated for a separate domain owner system.

13. The process of claim 11, further comprising:
accessing a second encrypted delegated private key from the domain owner system, the second encrypted delegated private key encrypted using the encryption key; and
decrypting the second encrypted delegated private key using the second decryption key to generate a second decrypted delegated private key, the second decrypted delegated private key capable of allowing the third party system to sign on behalf of the domain owner for messages restricted to a second subdomain of the domain owner system.

14. The process of claim 11, wherein the public-private key is generated using any public private key pair generation algorithm.

15. The process of claim 11, wherein the DNS record of the third party system further comprises a token to distinguish the DNS record from other text records published on a domain of the third party system, a creation time for the DNS record, an expiration time for the DNS record, a selector field to allow publication of multiple encryption keys on the same subdomain, and a field to indicate an algorithm used for encryption.

16. An apparatus including a processor and a memory, the memory storing program code executable by a processor that when executed causes the processor to:
generate a public-private key pair, the public key of the key pair being an encryption key, and the private key of the key pair being a decryption key;
publish the encryption key as a third party domain name service (DNS) record at a DNS system associated with the third party system;
access an encrypted delegated private key in a domain owner DNS record at a DNS server associated with a subdomain of the domain owner system, the encrypted delegated private key encrypted using the encryption key by the domain owner system, and the DNS server of the domain owner system being part of a global directory system capable of establishing the authenticity of the domain owner system;

decrypt the encrypted delegated private key using the decryption key, the decrypted delegated private key capable of allowing the third party system to sign on behalf of the domain owner for messages restricted to a first subdomain of the domain owner system;

generate a signature for a message of the first subdomain of the domain owner system using the delegated private key; and transmit the signature and the message to the recipient on behalf of the domain owner system.

17. The apparatus of claim 16, wherein the third party system publishes a plurality of encryption keys in DNS records at different subdomains of third party system, each encryption key generated for a separate domain owner system.

18. The apparatus of claim 16, the memory storing further program code executable by a processor that when executed causes the processor to:

access a second encrypted delegated private key from the domain owner system, the second encrypted delegated private key encrypted using the encryption key; and decrypt the second encrypted delegated private key using the second decryption key to generate a second decrypted delegated private key, the second decrypted delegated private key capable of allowing the third party system to sign on behalf of the domain owner for messages restricted to a second subdomain of the domain owner system.

19. The apparatus of claim 16, wherein the public-private key is generated using any public private key pair generation algorithm.

20. The apparatus of claim 16, wherein the DNS record of the third party system further comprises a token to distinguish the DNS record from other text records published on a domain of the third party system, a creation time for the DNS record, an expiration time for the DNS record, a selector field to allow publication of multiple encryption keys on the same subdomain, and a field to indicate an algorithm used for encryption.

* * * * *

UNITED STATES PATENT AND TRADEMARK OFFICE
CERTIFICATE OF CORRECTION

PATENT NO. : 9,800,402 B2
APPLICATION NO. : 15/594505
DATED : October 24, 2017
INVENTOR(S) : Peter Martin Goldstein Page 1 of 1

It is certified that error appears in the above-identified patent and that said Letters Patent is hereby corrected as shown below:

In the Claims

Claim 3, Line 55: replace "addresses" with --address--.
Claim 5, Line 18: replace "public private" with --public-private--.
Claim 12, Line 25: after "different subdomains of," insert --the--.
Claim 14, Line 41: replace "public private" with --public-private--.
Claim 19, Line 9: replace "public private" with --public-private--.

Signed and Sealed this
Sixth Day of November, 2018

Andrei Iancu
*Director of the United States Patent and Trademark Office*